United States Patent [19]

Peet, II et al.

[11] Patent Number: 5,231,876
[45] Date of Patent: Aug. 3, 1993

[54] METHOD AND APPARATUS FOR WIND SPEED AND DIRECTION MEASUREMENT

[75] Inventors: William J. Peet, II, West Allenhurst, N.J.; Christopher M. Kiraly, San Diego, Calif.

[73] Assignee: Peet Bros. Company, Inc., West Allenhurst, N.J.

[21] Appl. No.: 701,795

[22] Filed: May 17, 1991

[51] Int. Cl.$^5$ .......................... G01W 1/02; G01P 5/06
[52] U.S. Cl. ............................... 73/170.08; 73/861.85
[58] Field of Search .............................. 73/189, 861.85

[56] References Cited

U.S. PATENT DOCUMENTS

| | | |
|---|---|---|
| 685,590 | 10/1901 | Faltermayer et al. . |
| 2,600,011 | 6/1952 | MacDonald et al. . |
| 2,969,672 | 1/1961 | Sell et al. . |
| 3,119,260 | 1/1964 | Karmin . |
| 3,282,099 | 11/1966 | Kingman . |
| 3,364,740 | 1/1968 | Wong . |
| 3,387,491 | 6/1968 | Adams . |
| 3,610,039 | 10/1971 | Althouse et al. . |
| 3,678,485 | 7/1972 | Jones ................ 340/177 R |
| 3,713,336 | 1/1973 | Bernstein .............. 73/189 |
| 3,893,337 | 7/1975 | Jones .................. 73/188 |
| 4,031,754 | 6/1977 | Bedard ................. 73/188 |
| 4,078,426 | 3/1978 | Casani et al. .......... 73/189 |
| 4,177,673 | 12/1979 | Krueger ................ 73/189 |
| 4,548,074 | 10/1985 | Krueter ................ 73/189 |
| 4,631,958 | 12/1986 | Cauwenberghe et al. .... 73/189 |
| 4,631,959 | 12/1986 | Motycka ................ 73/189 |

FOREIGN PATENT DOCUMENTS

| | | |
|---|---|---|
| 2418328 | 10/1974 | Fed. Rep. of Germany . |
| 8912577 | 1/1990 | Fed. Rep. of Germany . |
| 970224A | 10/1983 | U.S.S.R. . |

Primary Examiner—Michael T. Razavi
Assistant Examiner—R. L. Biegel
Attorney, Agent, or Firm—Ratner and Prestia

[57] ABSTRACT

An apparatus for measuring wind speed and direction includes: a wind vane which has a permanent magnet, an anemometer which has a permanent magnet and a ferromagnetic member, and a stationary housing which has a radially mounted reed switch and an axially mounted reed switch. As the anemometer spins in the wind, the magnet in the anemometer closes the radially mounted reed switch, once per revolution. This produces a signal having a frequency proportional to wind speed. The magnet in the wind vane rotates around the stationary housing to a point determined by the direction of the wind. This magnet produces enough flux to keep the axially mounted reed switch closed. The ferromagnetic member is mounted in the anemometer so that it is interposed between the magnet in the wind vane and the axially mounted reed switch once per revolution. This draws flux away from the axially mounted reed switch, allowing it to open. The result is a second output signal having the same frequency as the first output signal but having a phase, with respect to the first output signal that depends on the wind direction. The direction of the fluid flow is determined by computing the phase difference between the first and second output signals.

12 Claims, 3 Drawing Sheets

METHOD AND APPARATUS FOR WIND SPEED AND DIRECTION MEASUREMENT

FIELD OF THE INVENTION

This invention relates generally to fluid velocity measurement techniques and particularly to measurement of wind speed and direction by a remotely located transducer.

BACKGROUND OF THE INVENTION

Devices for measuring wind velocity have been known for many years. The two most common devices used for this measurement are the wind vane and the anemometer. The wind vane is used to indicate wind direction and typically comprises an asymmetrical marker which is horizontally mounted on a vertical rotating shaft. The bulk of the area of the marker lies on one side of the vertical shaft. The marker is free to rotate so that it assumes a direction parallel to the flow of the surrounding air. The anemometer measures wind speed and typically consists of a plurality of hemispherical cups, each mounted at the end of an arm. The arms are radial members which rotate about a vertical central shaft. The speed of rotation is proportional to the wind speed.

The prior art produced many methods of retrieving electronic measurements of wind velocity from remotely located fluid velocity transducers. U.S. Pat. No. 2,600,011 to MacDonald, et al. features a device for measurement of fluid flow within a pipe or conduit. A twisted vane is mounted inside the pipe so as to rotate around the pipe's longitudinal axis with a speed proportional to fluid flow. A permanent magnet is disposed in a direction parallel to the pipe's longitudinal axis. The magnet is mechanically fixed to the vane with a radial displacement slightly less than the pipe's radius. A reed switch is situated just outside of the pipe, in a direction parallel to the magnet. The reed switch includes a pair of contact members which form a closed circuit path in the absence of substantial magnetic flux from the permanent magnet. When fluid flow actuates the vane, the magnet will periodically rotate to a position near the reed switch, causing the switch to open and close. By measuring the frequency with which the circuit opens, the fluid speed is measured.

U.S. Pat. No. 3,282,099 to Kingman features a wind speed and direction transducer in which a first reference marker is fixed on the rotating member of an anemometer and passes a first sensing means once each revolution. The first sensing means is disposed at a first angular disposition, fixed with respect to the axis of rotation (e.g., directed towards true north), to sense the first reference marker. The delay between successive passes of the first reference marker over the first sensing means provides a measure of wind velocity.

A second reference marker is fixed to a wind vane, and thus is oriented in the direction of the wind azimuth. A second sensing means is provided for sensing coexistence of the first and second reference markers at a single angular position. Circuit means are provided which serve to relate the elapsed time between sensing the first reference marker at the first disposition and at the second angular disposition for comparison to the elapsed time between the sensing of the first reference marker at the first angular position twice in succession. This provides a measure of the angular displacement between the wind azimuth and the fixed first reference marker.

The sensing means is provided by the use of an air dielectric capacitor arranged so that the two plates of the capacitor rotate with respect to one another once per revolution of the transducer. The plates are closely spaced and are formed and positioned so as to provide minimum and maximum capacitance values during each revolution of the transducer about its axis. This periodic variation in capacitance is used to provide an output signal having an amplitude proportional to the speed of rotation.

Kingman also features an alternate embodiment for sensing the speed of rotation in which the anemometer drives a rotating disc. The disc includes a plurality of fingers which pass between the pole pieces of a ring-type or other magnetic core. The core is energized to provide a magnetic flux between its two pole pieces. The fingers are of a highly permeable material so as to cause detectable variations in the magnetic flux field between the pole pieces.

U.S. Pat. No. 3,364,740 to Wong features a wind vane in which there is provided a permanent magnet fixed to rotate about the axis of rotation of the vane, such that the permanent magnet will always align with the direction from which the wind is blowing. A plurality of reed switches are provided in a circle concentric to the permanent magnet. The spacing between the circle of reed switches and the permanent magnet is such that the reed switch facing in the direction of the wind will be actuated by the magnet.

U.S. Pat. No. 3,420,101 to Adams features a wind vane and an anemometer mounted on separate, independently rotating shafts. The anemometer shaft rotates a disk on which are located two sets of indices. The first set of indices produces a pulse each time an index passes over a fixed pickup, to provide a measure of wind speed. There is a second fixed pickup and also a moveable pickup, attached to the wind vane shaft. A wind direction measuring interval is defined by the coincidence of the second set of indices with the second fixed pickup and the moveable pickup. The number of pulses by the first set of indices during this interval defines the wind direction. In Adams, each pickup includes a small ferrite core energized by high frequency AC current.

U.S. Pat. No. 3,713,336 to Bernstein features a transducer with a reed switch mounted to a rotating shaft upon which is mounted a wind vane, so that the switch points in the same azimuthal direction as the vane. A permanent magnet is fixed to a rotating anemometer shaft concentric to the reed switch, and at the same height as the switch. The reed switch is activated to produce an electrical signal each time the permanent magnet passes the reed switch.

Also positioned in the anemometer is a magnetic field responsive electric device, such as a magnetodiode, which has an electrical characteristic that changes in response to the magnitude and polarity of the magnetic field to which it is exposed. The magnetic field responsive device is connected in an electric circuit which produces a signal proportional to both the magnitude and direction of the earth's magnetic field and also to the speed of rotation of the anemometer.

Both the output signals from the wind vane and the anemometer have frequencies equal to the frequency of rotation of the anemometer. They differ in phase by an amount which is proportional to the angular displacement of the wind vane from a fixed direction (e.g., true north).

U.S. Pat. No. 4,548,074 to Krueter features an apparatus for measuring wind speed and direction comprising two electrical coils which produce respective electrical signals that are utilized to indicate the wind direction, and an anemometer which rotates actuators through signal producing gaps of the coils. The gap of the first coil is defined by a fixed tang, and the gap of the second coil is defined by a movable tang positioned by a wind vane.

SUMMARY OF THE INVENTION

Previously, wind velocity apparatus for electronically measuring both speed and direction of wind have employed relatively expensive components, such as coils, potentiometers, magnetodiodes, custom designed air capacitors, or ferrite cores. The present invention provides for measurement of both wind speed and direction using a simplified apparatus, to achieve a low cost of components and ease of assembly not previously attained. In addition, the components used in the present invention are inherently reliable and have a relatively long expected lifetime.

The present invention is embodied in a combined wind speed and direction sensor employing an inner central stationary housing, an inner rotating sleeve and an outer rotating sleeve surrounding the inner sleeve. The inner sleeve is coupled to conventional anemometer cup arms so that rotation of the inner sleeve is proportional to wind speed. The outer sleeve includes a wind direction vane so that the angular position of the outer sleeve is indicative of wind direction.

Two sensors are employed, both positioned in the stationary housing. The anemometer sleeve supports a first source of stimulus. The first sensor and the first source of stimulus are positioned such that the first sensor is activated during part of each revolution of the anemometer shaft. The sensor is activated at the same angular position regardless of the wind direction or the angular position of the wind vane sleeve.

A second sensor is mounted vertically and is centered within the stationary housing. The wind vane sleeve supports a second source of stimulus mounted vertically and proximate to the second sensor. In the absence of other effects, the second source of stimulus holds the second sensor in an activated state regardless of the angular orientation of the wind vane sleeve. The anemometer sleeve supports a shielding member, positioned so that it is interposed between the second sensor and the second source of stimulus during a portion of each rotation of the anemometer sleeve. When the shielding member is thus interposed, the stimulus is diverted through the member, which decreases the level of stimulus imposed upon the second sensor and allows the second sensor to become deactivated. The angular position of the wind vane sleeve determines when (during each revolution of the anemometer sleeve) the second sensor is deactivated.

Two timer circuits are employed to generate signals representing the first interval between consecutive activations of the first sensor and the interval between the activation of the first sensor and the next activation of the second sensor. The interval between activations of the first sensor is inversely proportional to wind speed. The ratio of the second interval to the first indicates the phase between a fixed reference direction (e.g., true north) and the wind direction. This ratio is used to determine wind direction.

DETAILED DESCRIPTION

The following is a description of an exemplary wind velocity transducer system in accordance with the present invention.

Figure 1:
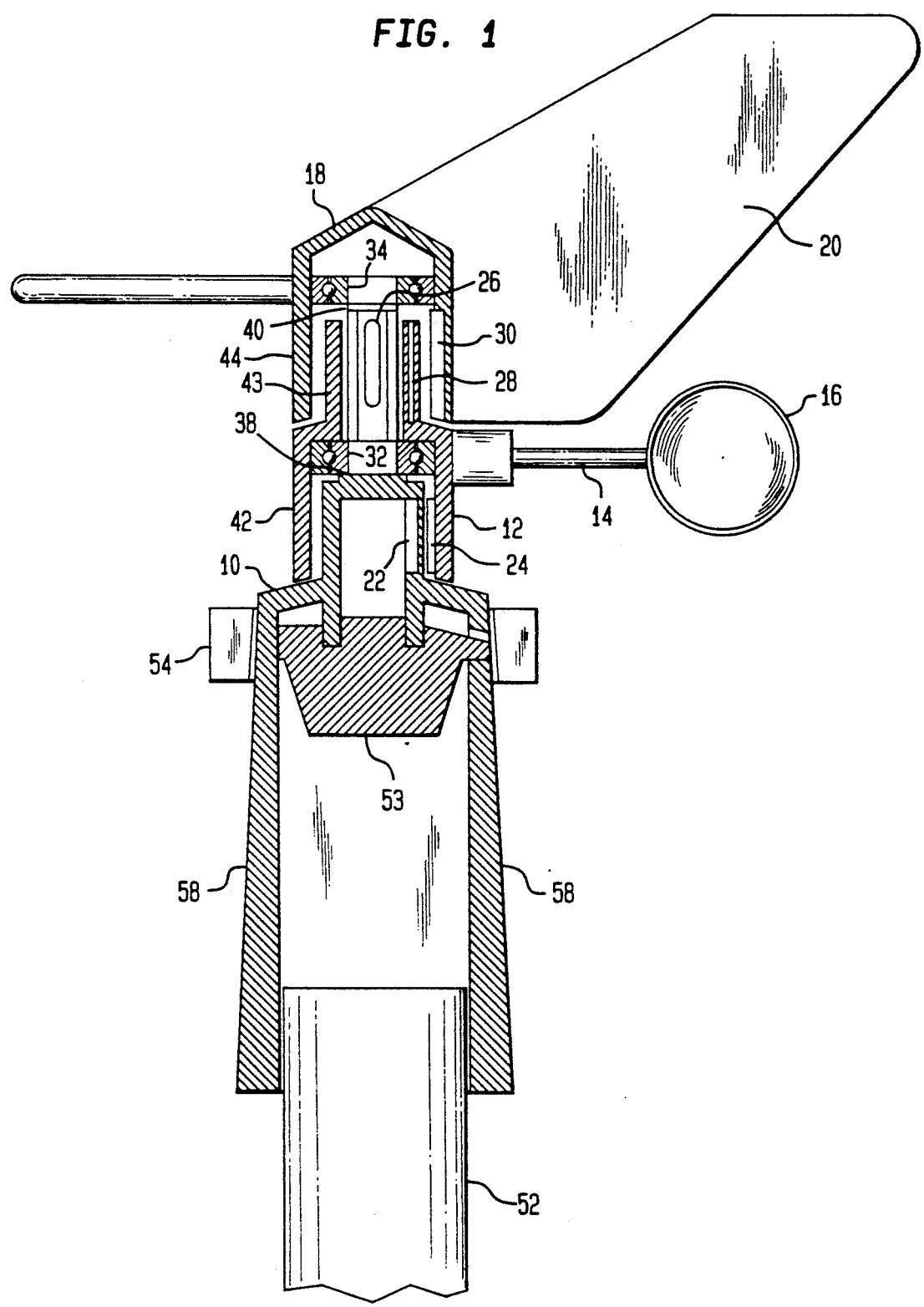
FIG. 1 is a cross sectional view of apparatus which includes an exemplary embodiment of the invention.
Figure 1A:
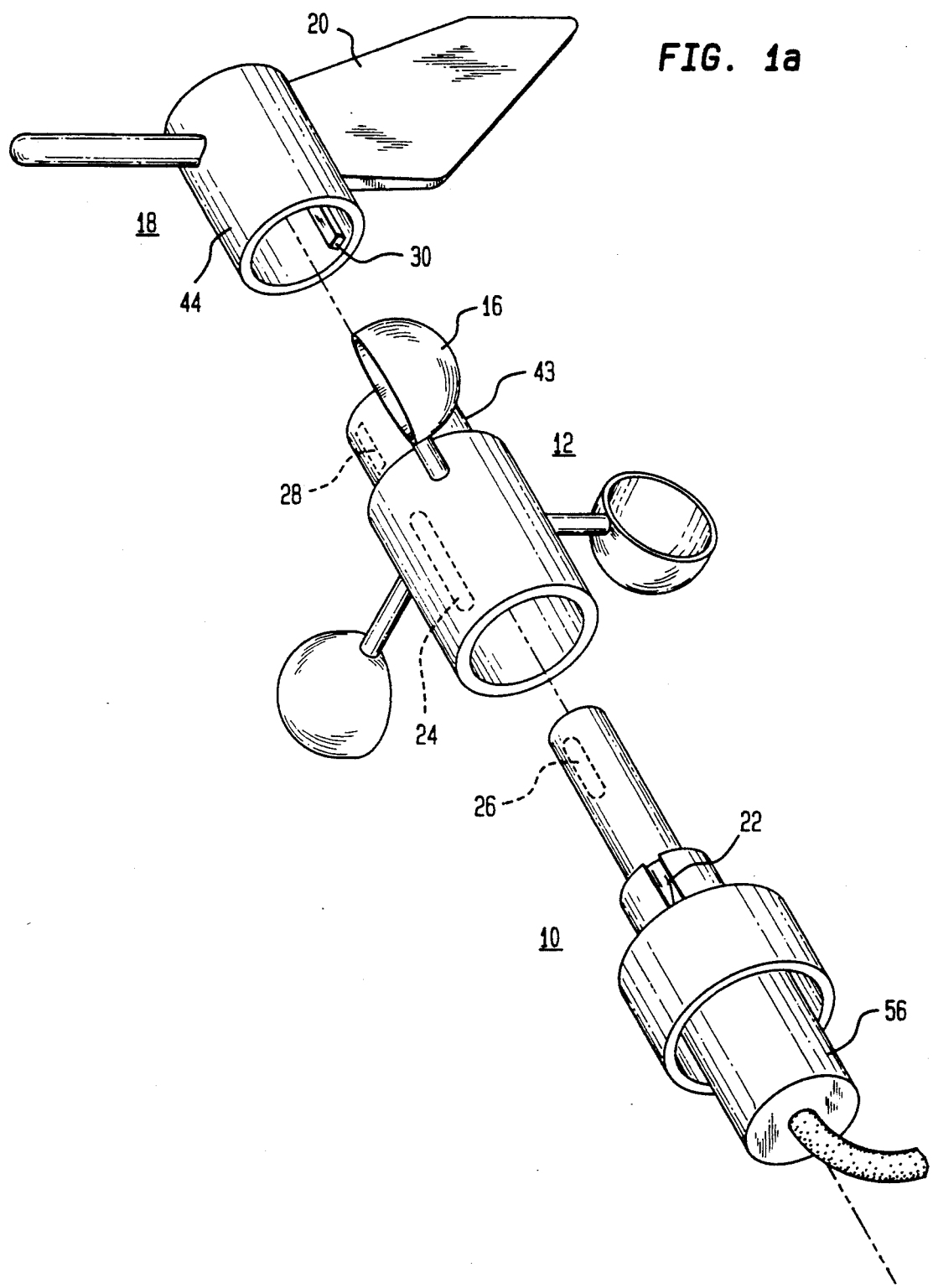
FIG. 1a is a blow up perspective drawing which illustrates the structure of the apparatus shown in FIG. 1.

FIG. 1 shows a cross sectional view of the transducer and FIG. 1a shows a perspective view of the transducer with individual parts separated to illustrate the structure of the transducer. The transducer includes a fixed housing 10 which may be mounted on an elevated structure such as the roof of a residence. Housing 10 includes two shoulders, 38 and 40. Ball bearing 32 is seated with its inner race upon shoulder 38 so that it rotates freely. Sleeve 12 is mounted upon ball bearing 38 and rotates freely with respect to housing 10. Shoulder 40 extends past the top of sleeve 12. Ball bearing 34 is mounted with its inner race on shoulder 40. Sleeve 18 is mounted on ball bearing 34 so that sleeve 18 rotates independently of sleeve 12 and of fixed housing 10. Housing 10, sleeve 12 and sleeve 18 are all molded from glass filled nylon, ABS/PVC composite, or other such material, providing strength and ultra-violet light resistance at a low fabrication cost. Other non-ferromagnetic materials may also be used.

In contrast to prior art wind vanes, which typically required a special installation fixture, housing 10 mounts directly atop a conventional one-and-one-quarter inch outside diameter television antenna mounting pipe 52. Fixed housing 10 has 3 or 4 tapered finger-like projections 58 extending down over the outside of pipe 52. A centering cone 53 is fitted inside housing 10 such that housing 10 will be coaxially aligned as it is pushed down onto pipe 52. Locking collar 54 is then pushed down over the outside of finger-like projections 58, forcing them inward against pipe 52 and locking housing 10 into correct position. With proper design this mounting arrangement can accommodate a reasonable range of pipe diameters.

Two conventional reed switches, 22 and 26, are mounted at fixed locations in housing 10. Reed switch 22 is mounted below shoulder 38, so that it is at the same height as the bottom section 42 of sleeve 12. Reed switch 22 is positioned parallel to the longitudinal axis of housing 10, and is situated close to the outer radius of housing 10. Reed switch 26 is mounted above ball bearing 32, between shoulder 38 and shoulder 40, so that it is at the same height as the bottom section 44 of sleeve 18. Reed switch 26 is located along the longitudinal axis of housing 10.

Sleeve 12 is mounted on ball bearing 32. A permanent magnet 24 is installed on the inside of the lower section 42 of sleeve 12, so that the midpoint of magnet 24 is at the same height as the midpoint of reed switch 22. Magnet 24 is oriented parallel to the longitudinal axis of housing 10 and to reed switch 22. The dimensions of housing 10 and sleeve 12, the strength of magnet 24 and the sensitivity of the reed switch are selected so that the reed switch 22 closes during part of each revolution of the sleeve 12, when the angular displacement between the reed switch 22 and the magnet 24 is less than a threshold value. This design task is understood by one skilled in the prior art.

Sleeve 12 supports radial arms 14, at the end of which are mounted conventional hemispherical anemometer cups 16. The arms 14 and cups 16 are fabricated from a lightweight material such as the glass filled nylon or ABS/PVC composite used for sleeve 12. Sleeve 12 also includes a ferromagnetic shield 28 which is positioned in the upper portion 43 of sleeve 12 and oriented parallel to the longitudinal axis of sleeve 12. In the exemplary embodiment of the invention, the shield 28 is a high permeability foil. The foil 28 is situated so that when sleeve 12 is positioned on ball bearing 32, foil 28 is at the same height as reed switch 26.

Sleeve 18 is mounted on ball bearing 34. A permanent magnet 30 is mounted inside of the lower section 44 of sleeve 18, such that magnet 30 is at approximately the same height as reed switch 26 and ferromagnetic foil 28. Sleeve 18 supports a conventional wind vane 20, and rotates freely with respect to housing 10, so that wind vane 20 orients itself parallel to the direction of the wind.

Reed switch 26 and magnet 30 are so selected that, in the absence of the ferromagnetic shield 28, magnet 30 will actuate reed switch 26. Since reed switch 26 lies along the central axis of housing 10, switch closure is independent of the angular displacement of magnet 30. Ferromagnetic foil 28 is designed and located so that, when it is interposed between reed switch 26 and magnet 30, it diverts magnetic flux, decreasing the magnetic field imposed upon the reed switch 26, and switch 26 opens. This occurs whenever the angular displacement between the ferromagnetic foil 28 and the magnet 30 is below a threshold value. While the magnet 30 is relatively static (moving only when the wind direction changes), foil 28 rotates with the same frequency as the anemometer sleeve 12. Reed switch 26 thus opens and closes approximately once per revolution of the sleeve 12.

Figure 2:
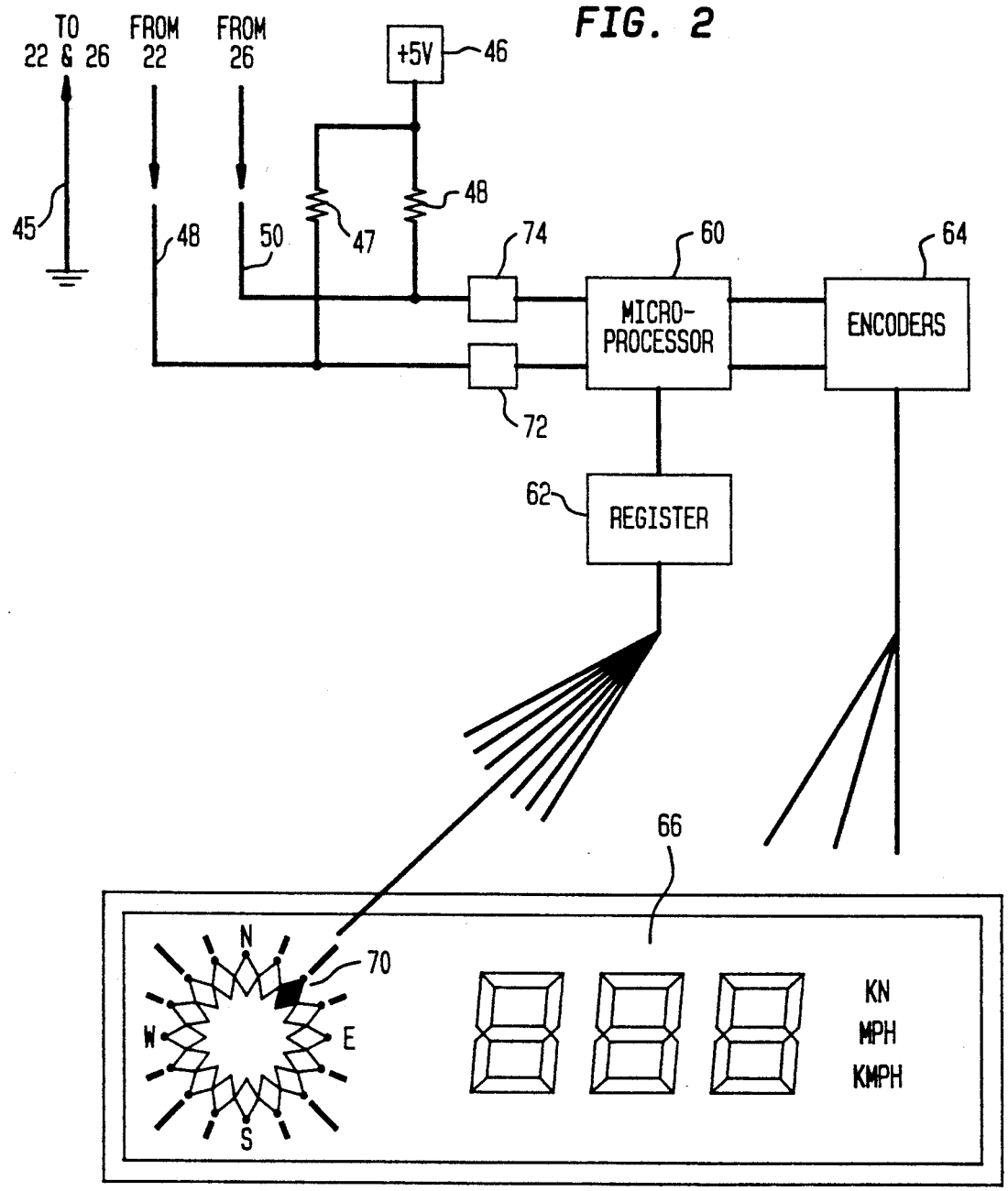
FIG. 2 is a block diagram, partly in schematic diagram form, showing the processing and display components of the apparatus shown in FIG. 1.

Referring to FIG. 2, a block diagram of the apparatus is shown, including the remotely located processing equipment and the display. A source of reference potential (e.g. ground) sinks current from both reed switches 22 and 26 via the connection 45. The respective output connections 48 and 50 from the reed switches 22 and 26 are provided to two timer circuits, 72 and 74. Each of the connections 48 and 50 is coupled to a 5 volt source of operating potential 46 through respective pull-up resistor 47 and 48. In this configuration, when one of the switches is open, the signal on its associated connection is +5 volts. When the switch is closed, this signal drops to approximately ground potential.

Timer circuit 72 generates a pulse signal where each pulse spans the interval between consecutive closures of reed switch 22. This signal is provided to the microprocessor 60 which may, for example, count a number of pulses of an internal clock signal (not shown) occurring during this interval to produce a value T1 which is proportional to the length of time between consecutive closures of the switch 22. Timer circuit 74 produces a pulse signal which is used by the microprocessor 60 in the same manner to measure the interval between the closure of reed switch 26 and the next successive closure of switch 22. This interval is represented by a value T2. The microprocessor 60 computes the ratio of T2:T1 and multiplies the result by 360 degrees to determine the angular displacement between the fixed reed switch 22 and the wind vane 20. Microprocessor 60 also calculates the current wind speed from the value T1. It is contemplated that the functions performed by the timer circuits 72 and 74 may be implemented in software and performed by the microprocessor 60.

Microprocessor 60 is used to filter out extraneous readings of wind speed and direction, whether caused by electrical noise or by abnormal acceleration of sleeve 12 or sleeve 18. Filtering is accomplished by calculating wind speed and wind direction for two successive revolutions of sleeve 12. If the two speed calculations differ by more than 20 percent, or if the two direction calculations differ by more than 22.5 degrees, the data is discarded and new readings are taken.

Additionally, the microprocessor 60 is programmed to provide a semi-automatic calibration mode for wind direction. This permits housing 10 to be mounted without special regard to its angular orientation. After housing 10 is fixed in position, the user aligns the wind vane toward north, activates the calibration mode and spins the anemometer cups. The microprocessor calculates and retains a fixed angular offset value such that thereafter, when the vane is aligned in that direction, north will be displayed.

In contrast to prior art wind velocity transducers, the present invention only uses two reed switches and two permanent magnets to provide the signals needed to extract wind speed and direction from a wind vane and anemometer. The present invention allows the use of low impedance circuits having very low levels of interfering noise while maintaining negligible current drain.

A number of convenient displays may be employed along with the transducer described above. FIG. 2 shows the microprocessor 60 providing wind speed values to seven segment encoders 64, which drive a liquid crystal display 66. A convenient display for wind direction is an analog format, such as a compass rose on the same liquid crystal display 66. Within the compass rose are sixteen direction diamonds, 70. Microprocessor 60 provides sixteen bits of data to output driver register 62. Each respective bit determines whether its respective direction diamond 70 is activated. Microprocessor 60 selects the direction diamond 70 which is closest to the actual wind direction and ensures that only one direction diamond at a time is activated.

It is contemplated that wind direction may also be provided by a digital display (not shown) with each bit pattern corresponding to a respectively different pattern of driving signals for a digital display. In this embodiment of the invention, the digital display would include three alpha-numeric display devices (not shown) for displaying, for example NNE, N, NNW, WNW, W, etc. Alternatively, a numeric display device such as LCD 66 may employed to display wind direction in degrees referenced to north.

Although the embodiment discussed above used reed switches to detect changes in the local magnetic field due to rotating magnets affixed to the apparatus, it is possible to accomplish equally good results using a Hall-effect device to measure either wind speed or wind direction. For example, Hall-effect devices could replace either or both of the reed switches 22 and 26 in the described embodiment of the invention. Hall effect devices can measure changes in a magnetic field to an accuracy of about one gauss. They are inexpensive, simple, small and reliable.

It is understood by one skilled in the art that many variations of the embodiments described herein are contemplated. The present invention may be embodied in other apparatus employing wind speed and direction transducers which rotate coaxially about a fixed housing. The transducers may be any of a number of different sensor elements which sense for example electromagnetic or other types of radiation. The transducers are activated by sources of stimulus such as light-emitting diodes or low-level radiation sources such as tritium capsules.

For example, a second embodiment of the invention (not shown) uses the motion of the transducer to change the reluctance of an electromagnet with each rotation, producing a signal whose frequency is proportional to wind speed. A third embodiment (not shown) uses a permanent magnet to induce a voltage spike into a coil with each rotation.

The stimulus need not be an electromagnetic field. A fourth embodiment of the invention (not shown) employs a light source, such as a tritium capsule, as the source of stimulus. The light beam is modulated by the vane which reduces the stimulus sensed by the sensor once per rotation. A fifth embodiment (not shown) uses a radioactive material, such as Americium 241, as a source of stimulus, with an alpha particle damping material mounted on the other rotating transducer.

Although the detailed description of the invention encompasses a design in which the source of stimulus (magnet 30) is displaced further from the axis of rotation than the gain source (foil 28), the invention can also be applied with the stimulus source closer to the axis of rotation. This is a matter of design choice understood by one of ordinary skill in the art, and it applies to various ones of the embodiments discussed herein. Furthermore, while the described embodiment of the invention is shown with the direction transducer coupled to the coaxially mounted sensor and the speed transducer coupled to the other sensor, it is contemplated that the relative positions of these sensors may be reversed.

While the invention has been described in terms of exemplary embodiments, it is contemplated that it may be practiced as outlined above with modifications within the spirit and scope of the appended claims.

The invention claimed is:

1. Apparatus for measuring fluid speed and direction comprising:

A stationary housing;

first and second members rotatably mounted on said stationary housing, for rotating coaxially and independently about said stationary housing;

a self-contained source of stimulus, mounted on said first member to rotate about the stationary housing, wherein said self-contained source of stimulus is an element selected from the group consisting of a magnet, a light source and a radiation source;

sensor means, responsive to said source of stimulus, mounted on the stationary housing, for providing an output signal indicating a threshold level of said stimulus;

means, mounted on said second member, for varying the level of said stimulus which reaches said sensor to indicate the relative angular displacement between said first and second members;

fluid speed transducer means, mounted on one of said first and second members, for rotating in a predetermined direction with an angular velocity proportional to the speed of the fluid;

first circuit means including a means for sensing the rotation of said transducer means with respect to said stationary housing, for providing a first output signal indicating the speed of rotation of the fluid speed transducer means;

fluid direction transducer means, mounted on another of said first and second members, for rotating to a position in which the fluid direction transducer means is parallel to the direction of flow of the fluid;

second circuit means, responsive to the sensor means, for providing a second output signal indicating whether the detected stimulus exceeds the threshold level; and means for determining the direction of fluid flow from said first and second output signals.

2. The apparatus of claim 1 wherein the fluid is air, the fluid speed transducer means includes an anemometer and the fluid direction transducer means includes a wind vane.

3. The apparatus of claim 1 wherein the means for varying the stimulus which reaches said sensor means diminishes the stimulus.

4. The apparatus of claim 1 wherein the means for varying the stimulus which reaches said sensor means increases the stimulus.

5. The apparatus set forth in claim 1 wherein the source of stimulus is a magnet and said sensor means includes a reed switch.

6. The apparatus set forth in claim 1 wherein the source of stimulus is a magnet and the sensor means includes a Hall-effect device.

7. The apparatus set forth in claim 1 wherein the fluid is air, the fluid speed transducer means includes an anemometer, the fluid direction transducer means includes a wind vane, and said apparatus further comprises:

a plurality of tapered mounting pieces, coupled to the bottom of said stationary housing and projecting downward, for slideably mounting said housing over a standard antenna mounting pipe, such that the widest portion of said mounting pieces extends around the outside of the mounting pipe;

a conical projection, coupled to the bottom of the stationary housing and projecting downward inside said antenna mounting pipe, so as to align the central axis of said stationary housing with the axis of the mounting pipe; and a locking collar slideably mounted around said tapered mounting pieces, for providing a compression joint between the mounting pieces and the antenna mounting pipe.

8. Apparatus for measuring fluid speed and direction comprising:

A stationary housing;

fluid speed transducer means, rotatably mounted on said stationary housing, for rotating about an axis of rotation in a predetermined direction with an angular velocity proportional to the speed of the fluid;

A first magnet coupled to said fluid speed transducer means and rotating around said stationary housing with each rotation of the fluid speed transducer means;

first magnetic field detector means for providing a first output signal indicating the angular velocity of the fluid speed transducer means;

fluid direction transducer means, rotatably mounted on the stationary housing, for rotating to a position in which the fluid direction transducer means is parallel to the direction of flow of the fluid;

a second magnet, situated on the fluid direction transducer means and rotating around the stationary housing with the fluid direction transducer means;

second magnetic field detector means mounted on the stationary housing symmetric with said axis of rotation for providing a second output signal indicating a threshold magnetic flux from said second magnet;

means for diverting magnetic flux, situated on the fluid speed transducer means and positioned with respect to said second magnet and said second magnetic field detector means during part of the rotation of the fluid speed transducer means to reduce the magnetic flux applied to said second magnetic field detector to a level below said threshold; and means for determining the velocity and the direction of the fluid flow from said first and second output signals.

9. In a system for measuring fluid speed and direction which includes fluid speed and direction transducers separately rotatably mounted on a stationary housing including first and second magnetic flux sensors, first and second magnets mounted on said respective fluid speed and direction transducers to actuate the respective first and second magnetic flux sensors, and a ferromagnetic body mounted on said fluid speed transducer so as to be interposed between said second magnet and said second magnetic flux sensor as said fluid speed transducer rotates, a method of measuring the direction and velocity of fluid flow comprising the steps of:

rotating said first magnet and said ferromagnetic body around said stationary housing with an angular velocity proportional to the speed of the fluid to generate a electrical signal from said first magnetic flux sensing means, wherein the frequency of the signal is proportional to the speed of the fluid;

aligning the second magnet and the second magnetic flux sensing means in a direction having a predetermined relationship to the direction of fluid flow;

generating a second electrical signal responsive to said ferromagnetic body being positioned between said second magnet and said second magnetic flux sensor, said second electrical signal being indicative of a reduction in magnetic flux sensed by said second magnetic flux sensor, and said second electrical signal having a phase difference with respect to said first electrical signal which indicates the direction of fluid flow; and measuring the frequency of said first signal to determine the speed of said fluid and the phase difference between said first and second signals to determine the direction of said fluid flow.

10. A method of calibrating the apparatus set forth in claim 1, in which the apparatus further includes a digital data processor, the method including the steps of:

fixedly mounting said stationary housing;

aligning said fluid direction transducer towards a specific direction;

actuating the fluid speed transducer;

providing said first and second electrical signals to the data processor from the fluid speed transducer and the fluid direction transducer, respectively in response to the actuation;

determining calibration constants, using the data processor, in response to a measured phase difference between said first and second electrical signals, and storing said calibration constants;

whereby the calibration constants are used to determine fluid direction.

11. Apparatus, including a stationary housing for measuring fluid speed and direction, comprising:

fluid speed transducer means, rotatably mounted on said stationary housing, for rotating about an axis of rotation in a fixed direction with an angular velocity which is proportional to the speed of the fluid;

A first magnet, coupled to said fluid speed transducer means, disposed to rotate around said stationary housing with each rotation of the fluid speed transducer means;

first magnetic field detector means, situated on the stationary housing and responsive to said first magnet, for providing a first output signal having at least one output pulse for each rotation of the fluid speed transducer means;

fluid direction transducer means, rotatably mounted on said stationary housing, for rotating to an angular position in which the fluid direction sensing means is parallel to the direction of flow of the fluid;

a second magnet, coupled to said fluid direction transducer means to rotate around said stationary housing with the fluid direction transducer means;

second magnetic field detector means mounted on the stationary housing symmetric with the axis of rotation for producing a second output signal;

magnetic flux diverting means mounted on the fluid speed transducer means so as to be interposed between said second magnet and said second magnetic field detector means during a part of the rotation of the fluid speed transducer means, whereby said second magnetic field detector means produces a pulse in said second output signal when the magnetic flux diverting means is so interposed; and means for determining the direction of the fluid flow from a phase difference between said first and second output signals.

12. An instrument for measuring speed and direction of flow of a fluid comprising:

a stationary central body including first and second magnetic flux sensors;

fluid speed transducer mounted to rotate around the outside of said central body said fluid speed transducer including a magnet and a ferromagnetic element which periodically activate said first magnetic flux sensor and periodically shield said second magnetic flux sensor, respectively, and which causes said instrument to produce a first output signal having a frequency proportional to fluid speed;

a fluid direction transducer rotatably mounted on said central body and including a second magnet which activates said second magnetic flux sensor at all times except when said second magnetic flux sensor is shielded by said fluid speed transducer to produce a second output signal having a frequency which is proportional to fluid speed and a phase with respect to said first output signal which is indicative of direction of fluid flow; and means for calculating fluid speed from said first output signal and for calculating direction of fluid flow from said first and second output signals.

* * * * *